US012663292B2

(12) United States Patent
Danilov

(10) Patent No.: US 12,663,292 B2
(45) Date of Patent: Jun. 23, 2026

(54) ODOMETER AND INSPECTION AND/OR CLEANING DEVICE

(71) Applicant: Rosen IP AG, Stans (CH)

(72) Inventor: Andrey Danilov, Lingen (DE)

(73) Assignee: Rosen IP AG, Stans (CH)

( * ) Notice: Subject to any disclaimer, the term of this patent is extended or adjusted under 35 U.S.C. 154(b) by 420 days.

(21) Appl. No.: 18/559,212

(22) PCT Filed: May 6, 2022

(86) PCT No.: PCT/EP2022/062346
§ 371 (c)(1),
(2) Date: Nov. 6, 2023

(87) PCT Pub. No.: WO2022/234119
PCT Pub. Date: Nov. 10, 2022

(65) Prior Publication Data
US 2024/0240968 A1      Jul. 18, 2024

(30) Foreign Application Priority Data

May 7, 2021     (BE) .................................. 2021/5373

(51) Int. Cl.
*F16L 55/48*          (2006.01)
*B60B 19/12*          (2006.01)
(Continued)

(52) U.S. Cl.
CPC .............. *G01C 22/02* (2013.01); *F16L 55/48* (2013.01); *G01B 3/12* (2013.01); *F16L 2101/12* (2013.01)

(58) Field of Classification Search
CPC ...... G01C 22/02; G01C 22/025; G01C 22/00; G01C 21/20; G01C 21/12; G01C 21/165; G01C 5/00; F16L 55/48; F16L 55/26;

F16L 2101/12; F16L 2101/30; F16L 2101/10; F16L 2101/70; F16L 2101/00; G01B 3/12; G01B 21/06; G01B 7/042; G01B 7/02;
(Continued)

(56) References Cited

U.S. PATENT DOCUMENTS 6,125,955 A * 10/2000 Zoretich ............... B60B 19/006
                                                           180/7.1
2015/0171676 A1* 6/2015 Kobayashi ............. H02K 1/276
                                                           310/156.43
2020/0100658 A1* 4/2020 Abbott ................. A61B 1/0051

FOREIGN PATENT DOCUMENTS

CN          102621218 A      8/2012
WO          2021156433 A1    8/2021

OTHER PUBLICATIONS

Patrick Schoeneich et al: "Tubulo—A train-like miniature inspection climbing robot for ferromagnetic tubes", Applied Robotics for the Power Industry (CARPI), 2010 1st International Conference on, IEEE, Piscataway, NJ, USA, Oct. 5, 2010 (Oct. 5, 2010), pp. 1-5, XP031792262, ISBN: 978-1-4244-6633-7.

* cited by examiner

*Primary Examiner* — Jeffrey P Aiello
(74) *Attorney, Agent, or Firm* — Husch Blackwell LLP

(57)          ABSTRACT

An odometer is provided for distance measurement in an inspection and/or cleaning device. The odometer includes a carrier provided for rolling on a surface, and which is arranged in a holder of the odometer so as to be rotatable about an axis of rotation. The carrier has a multiplicity of magnets arranged circumferentially around the axis of rotation. The odometer also includes a magnetic field sensor for generating signals produced through rotation of the magnets of the carriers.

17 Claims, 9 Drawing Sheets

(51) Int. Cl.

| | | |
|---|---|---|
| *F16L 55/28* | (2006.01) | |
| *F16L 101/12* | (2006.01) | |
| *G01B 3/12* | (2006.01) | |
| *G01B 7/04* | (2006.01) | |
| *G01C 22/02* | (2006.01) | |
| *G01D 5/12* | (2006.01) | |

(58) Field of Classification Search

CPC ..... B60B 19/006; B60B 19/12; B60B 19/003; G01P 3/487; G01P 3/50; G01P 3/44; G01P 1/07; G01D 5/145; G01D 5/24485; G01D 11/245; G01D 11/30

USPC ............. 73/490, 862.331, 493, 1.41, 514.39, 73/514.31, 514.16, 862.333, 862.193; 324/174, 166, 207.2, 207.21, 207.11, 179, 324/207.13, 207.24; 340/207.25, 988, 340/3.1, 671, 815.87; 702/165, 163, 164, 702/145, 158, 150, 151, 97, 116, 179, 702/170, 94, 189, 127

See application file for complete search history.

ODOMETER AND INSPECTION AND/OR CLEANING DEVICE

CROSS REFERENCE

This application claims priority to PCT Application No. PCT/EP2022/062346, filed May 6, 2022, which itself claims priority to Belgian Patent Application No. BE2021/5373, filed May 7, 2021, the entireties of both of which are hereby incorporated by reference.

FIELD OF THE INVENTION

The present invention relates to an odometer for distance measurement in an inspection and/or cleaning device, wherein the odometer comprises a carrier, which is provided for rolling on a surface, is arranged in a holder of the odometer so as to be rotatable about an axis of rotation and has a multiplicity of magnets, which are arranged circumferentially around the axis of rotation. Moreover, the odometer comprises a magnetic field sensor for generating signals produced through rotation of the magnets of the carriers. The invention furthermore relates to an inspection and/or cleaning device comprising such an odometer.

BACKGROUND OF THE INVENTION

An odometer, or odometer wheel, which has a multiplicity of magnets arranged circumferentially around an axis of rotation of a wheel-shaped carrier, is known from CN 102621218 A. These magnets are moved past a magnetic field sensor, so that, depending on the rotational movement of the wheel, a corresponding measuring signal is produced. The circumference of the odometer wheel is used for inferring the distance covered from an analysis of this signal. However, this device is disadvantageous in that, in heavily contaminated oil pipelines, for example, slippage of the wheel often occurs. In such a case, the measuring results are inaccurate. CN 102621218 A therefore proposes arranging a plurality of such odometers in an inspection and cleaning device. This complicates the evaluation due to the data fusion and, at the same time, the odometers present may likewise have the same problems due to slippage. Furthermore, the arrangement of a plurality of odometers makes the device more expensive, makes the device heavier and reduces the usable space.

BRIEF SUMMARY OF THE INVENTION

An object of the present invention is to design an odometer and an inspection and/or cleaning device having such an odometer in such a way that the length of the distance covered may be determined more accurately and, at the same time, the number of odometers may be kept as low as possible.

According to the invention, the carrier is designed to generate a closed magnetic circuit with a respective magnet and the magnetizable wall of, for example, a pipeline. The magnets are arranged circumferentially around the axis of rotation of the carrier and, at the moment of closest proximity of one of the magnets to the surface or the wall of the pipeline, a strong attractive force between the wall and the magnet or carrier is generated by the magnetic field. This improves the adhesion of the odometer on the surface of the wall, so that the friction force resulting in a rotation of the wheel is increased. In particular, in oil-coated inner surfaces of pipelines, more accurate determination of the distance covered is possible. The magnetic attraction works between the carrier and the wall and not in a axle bearing of the odometer. Therefore, for example, the contact pressure of the holder and the accompanying bearing friction in the axle bearing may be reduced. This applies not only to the use of odometers according to the invention in pipelines but also to the use of odometers according to the invention on other magnetizable walls. The attractive forces generated between the magnets and the surface of the object to be checked improve the rolling of the wheel-shaped carrier. The magnetic field sensor records the magnetic field of the magnets of the carrier which are moved past the magnetic field sensor, in particular, when a closed magnetic circuit with the wall is not present. The amplitudes of the measuring signals may moreover provide information about the state of the odometer, in particular with regard to deformation or slipping of the wheel or carrier occurring in spite of the magnetic attractive forces.

As a result of the odometers being specifically designed for attraction to a surface, the bearing friction of the bearing close to the axis of rotation, which is generated by the necessary contact pressure of the odometer wheel on the surface of the wall, may be reduced. In particular, the contact pressure during operation may be reduced and corresponding devices may be configured to be smaller. Nevertheless, conventional odometers of inspection and/or cleaning devices may also be replaced by odometers according to the invention, i.e. the pressing forces present are also identical to before. The torque which acts on the odometer and is generated by the friction between the wheel and the surface is therefore based on a force which is at least also determined by the magnetic attraction.

There are a number of possible designs for a closed magnetic circuit; for example, a horseshoe shape produced by the magnet. However, the carrier advantageously has at least one magnetizable conducting element, which conducts and, in particular, focuses the magnetic field of a respective magnet. Such a conducting element is at least substantially made from a magnetizable metal, in particular from a ferromagnetic material, and may conduct the magnetic field between opposite poles of two magnets. In particular, the magnetizable conducting element conducts the magnetic field lines of a magnet towards the surface along which the odometer moves and on which the carrier rolls.

The individual magnets are preferably arranged with their North-South alignments (N-S alignments) at an angle <15° to the axis of rotation and, in particular, parallel to the axis of rotation, so that the spacings between the poles of the magnet and the surface are at least approximately, preferably precisely, the same. A symmetrical design aids the rolling of the wheel due to the accompanying lack of imbalance. The North-South alignments of successive magnets in the circumferential direction are preferably the same, so that closed magnet circuits are not produced between mutually successive magnets in the circuit and when using conducting elements.

In particular, the magnets should be arranged in the carrier so as to be as close to the wall to be observed, whilst being protected at the same time. By way of example, the magnets are arranged along the circumference of the carrier so as to be a maximum of 1 cm, preferably a maximum of 0.5 mm, away from the wall during operation.

Two conducting elements are preferably associated with each magnet, wherein the magnet is arranged, in particular, parallel to the axis of rotation and the conducting elements delimit a respective magnet on both sides in the direction parallel to the axis of rotation. Furthermore, the conducting elements extend radially outwards to form a respective magnetic circuit with the wall, so that, in a section along the axis of rotation, a U shape or approximate horseshoe shape is produced by the magnet, in which the magnet forms a part close to the axis and the conducting elements represent the two limbs of the "U" or horseshoe which point in the direction of the surface of the wall of the pipeline during operation. The magnets are preferably spaced 0.5 to 4 cm from the radial outer circumference of the carrier.

As a result of the U- or horseshoe-shaped structure, the magnetic field lines are conducted to the surface in an optimal manner so that a magnetic connection with the surface is produced and, accordingly, a good interaction and attractive force is present during operation. The conducting elements are situated at the sides of the magnet and, from there, point in the radial direction towards the outer circumference of the carrier. They moreover act as stabilizing means since a mass which is situated radially outwards in relation to the axis of rotation is accelerated by rotation of the carrier. The conducting elements may be designed, in particular, as segments of a circular disk, which delimit the magnets, and, in addition, any circumferential coatings or sheathing present may form the circular circumference of the carrier, as seen from a side view in the direction of the axis of rotation.

The magnets are preferably configured in such a way that, at the moment of closest proximity of the respective magnet to the surface of the wall, the component of a rolling friction which is produced by the magnetic attractive force of the magnets outweighs that produced by a pressing force exerted by the holder, i.e. the magnetic attractive force at least substantially determines the rolling friction.

Within the context of numerous assessments, it has been shown that the magnetic field strength of at least one of the magnets at the outer circumference of the carrier and, during operation, in the wall is at least 5 kA/m, preferably at least 10 kA/m and, in particular, at least 50 kA/m. Corresponding magnetic field strengths of the odometer are therefore at least one, preferably two or three, order(s) of magnitude greater than those used in the prior art to merely to determine the revolutions of the wheel or carrier.

In particular, the magnetic field strength of at least one of the magnets at the outer circumference of the carrier in the air and away from the wall is a maximum of 500 kA/m, in particular a maximum of 200 kA/m and, especially, a maximum of 100 kA/m. In a range between 50 and 100 kA/m, odometers according to the invention can preferably be used, in particular, for pipelines in which oil is transported. A magnet is away from the wall if, during operation, it is at least a quarter revolution of the carrier away from its next position on the wall and, in particular, if the magnet is at the greatest spacing from the wall.

The above observations on the magnetic field strengths take into account the progression of the magnetic field due to the conducting elements.

The magnets are preferably designed so as to be movable relative to the magnetic field sensor arranged on or in a holder of the odometer, so that the evaluation of the signals is relatively simple. The magnetic field sensor is additionally preferably arranged eccentrically with respect to the axis of rotation and, in particular, at the circumference of the carrier. By way of example, it is fastened in or on a base of the holder, between two supporting arms of the holder holding the carrier.

At the circumference of the carrier, an odometer according to a further embodiment of the invention is provided with a flexible sheathing, wherein a flexible sheathing is one which, depending on the magnetic field strength present, experiences a reduction in thickness in the radial direction of at least 10%, preferably at least 30% and, in particular, at least 40% during the rolling movement. This compression or elastic deformation of the material takes place when the respective magnet is at its closest proximity to the surface during the rolling of the carrier. After a further rolling movement, the material may then expand back to its original thickness. As a result, any magnetically adhering dirt or grime which has been driven over is further away from the magnet of the carrier, so that its magnetic field strength is reduced. Due to the magnetic field which is simultaneously present in the wall, magnetically adhering dirt will tend to adhere to the wall, and the carrier and the wheel formed thereby will therefore remain clean. In particular, the sheathing is a maximum of 2 mm thick, in particular a maximum of 1 mm thick, in the radial direction.

Alternatively or in addition, the wheel-shaped carrier may have a circumferentially extending, non-magnetic coating, at least on one side. Non-magnetic coatings are preferably present on both sides of the magnet and/or associated conducting elements and create a spacing from the magnetized conducting elements or from the magnet and therefore reduce the adhesion of material and grime. With respect to the axis of rotation, the coating may be designed in the shape of a circular ring or in the shape of a disk on both sides of the magnet in each case so that a shield is produced at least in the outer circumferential region in which dirt is most likely to adhere.

If any dirt which could not be kept off using the above-mentioned measures still adheres magnetically, it may be useful according to a further advantageous development of the invention if the odometer has a cleaning element for scratching off adhering magnetic dirt, which cleaning element acts at least on a region located at the circumference of an outer surface of the carrier, i.e. which is arranged, in particular, at a slight spacing <5 mm from an outer surface of the carrier. Accordingly, this may be a scraper, for example, which removes dirt revolving in the circumferential direction or on the sides of the carrier so that an attractive force between the carrier or odometer and the surface during a measuring operation may still be optimal. The same also applies to odometer variants which do not have a sheathing or coating. The cleaning element is preferably made from a non-magnetic and non-magnetizable material, for example from a polyurethane.

The object presented at the outset is additionally achieved by a cleaning and/or inspection device comprising an odometer described above or below, in which a pressing device acting on the holder is additionally present to position the carrier on a surface and which is notable in that, during operation, a pressing force of this pressing device, which acts in an axle bearing, is lower than an attractive force produced by a magnet which is close to the surface. Accordingly, the friction torque of the carrier is produced substantially by the magnetic interaction of the magnets. A magnet is close to the surface at the moment of its smallest spacing from the surface of the wall during a measuring operation.

Alternatively or in addition, an inspection and/or cleaning device according to the invention comprises an EDP device for receiving the signals of the magnetic field sensor, wherein this EDP device may be part of an EDP device which is continuously connected to the inspection and/or cleaning device, in particular integrated therein, or part of an arrangement which is not continuously connected to the cleaning and/or inspection device. In particular, the signals or measuring data of the magnetic field sensor or the odometer are stored in a memory of the EDP device during a measuring operation. In addition, the EDP device may already evaluate the signals of the magnetic field sensor during the measuring operation and accordingly couple further measuring data of an inspection device, if present, to corresponding position or distance data.

The inspection and/or cleaning device preferably likewise comprises an analysis device which can be connected thereto and which is designed to infer wear, deformation and/or slipping of the carrier with the aid of a signal curve. Wear on the carrier is revealed, in particular, by a deviation from the original amplitudes of the measured signal, whilst wheel slip can be detected via the spacing between the amplitudes (in temporal terms).

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Individual technical features of the exemplary embodiments described below may also lead to developments according to the invention when combined with the features at least of the independent claims. If useful, functionally similarly acting parts are denoted by identical reference signs.

Figure 1:
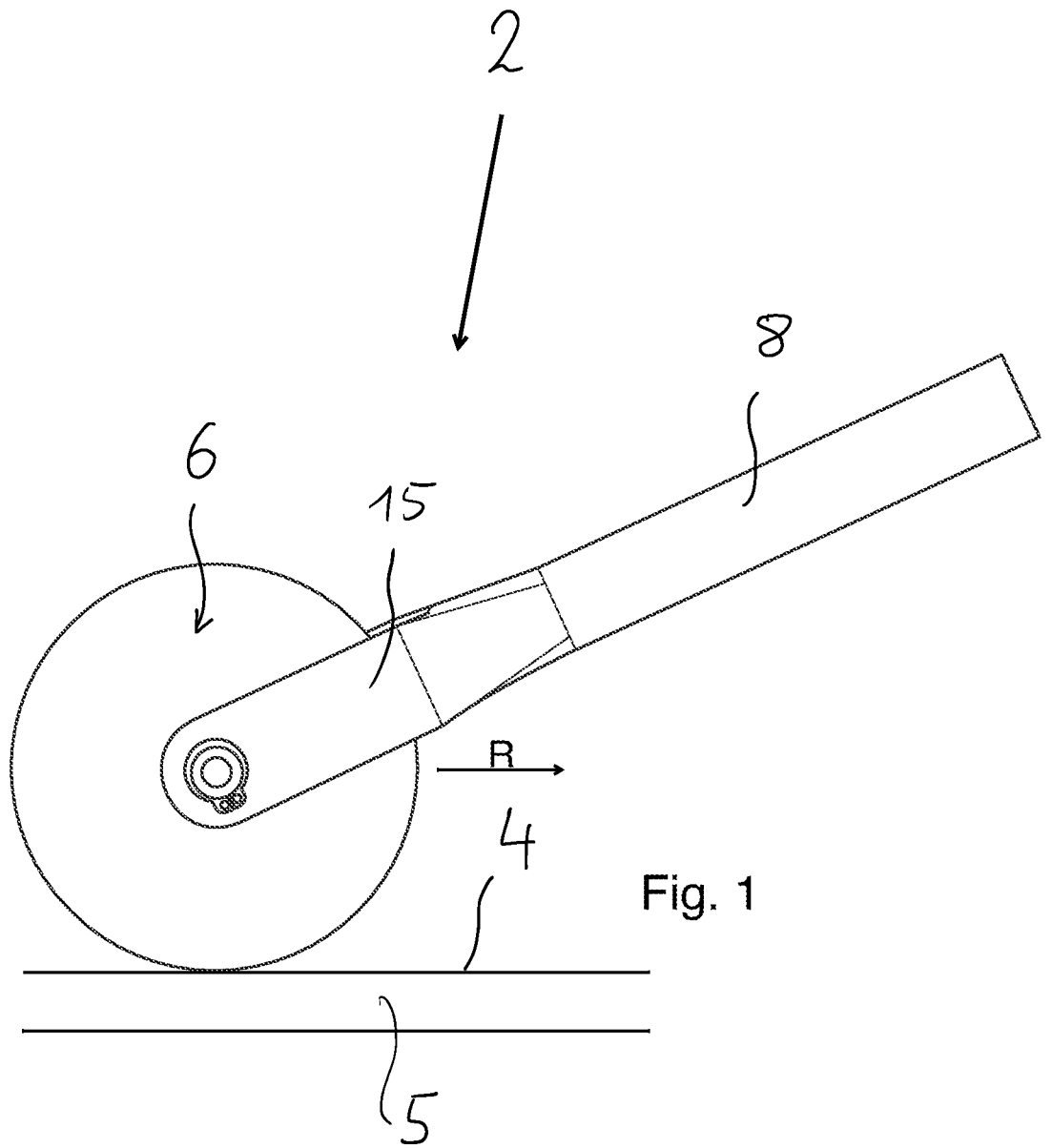
FIG. 1 shows a subject matter according to the invention in a side view.
Figure 2:
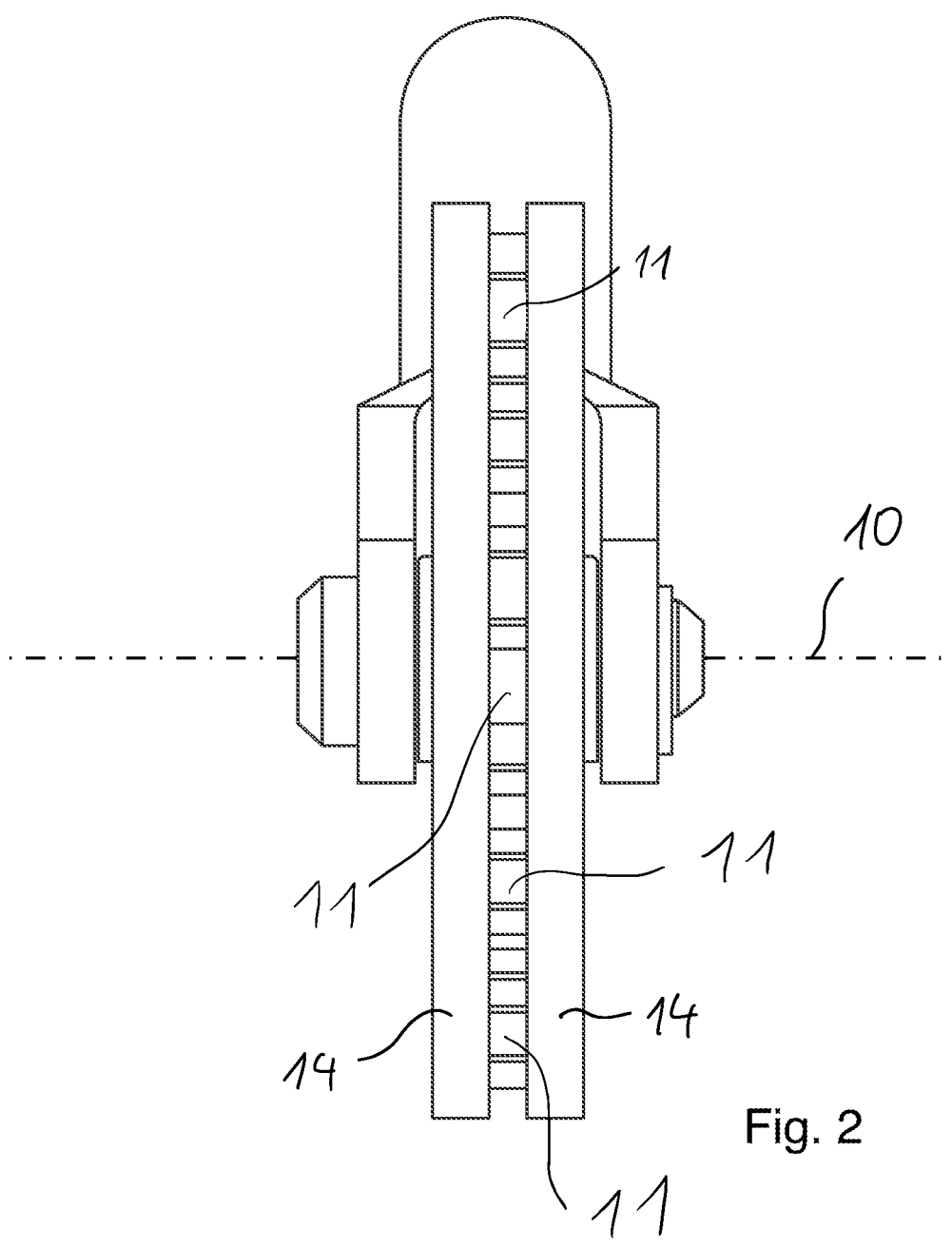
FIG. 2 shows the subject matter according to FIG. 1 in a view from the front.
Figure 3:
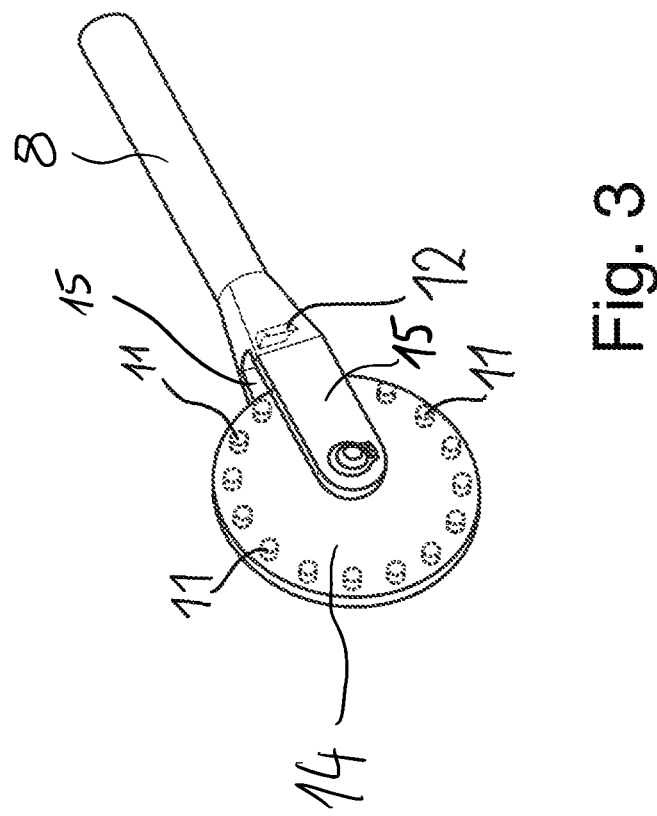
FIG. 3 shows the subject matter according to FIG. 1 in a perspective view.

An odometer 2 according to the invention is generally designed to roll on a surface 4 of a wall 5, for example of a pipeline. To this end, a rollable carrier 6, typically in wheel form, held by a holder 8, rolls on the surface 4 in the direction R. During operation, signals from magnets rotating about an axis of rotation 10 of the odometer 2 are generated via a magnetic sensor 12 (c.f. FIG. 3) and, in a development of the invention as an inspection and/or cleaning device, are stored in an associated memory unit of an EDP device 30. The maxima and minima measured in the magnetic field sensor 12 are generally produced from the sequence of mutually successive magnets 12 with the same North-South alignments extending parallel to the axis of rotation 10.

Figure 5:
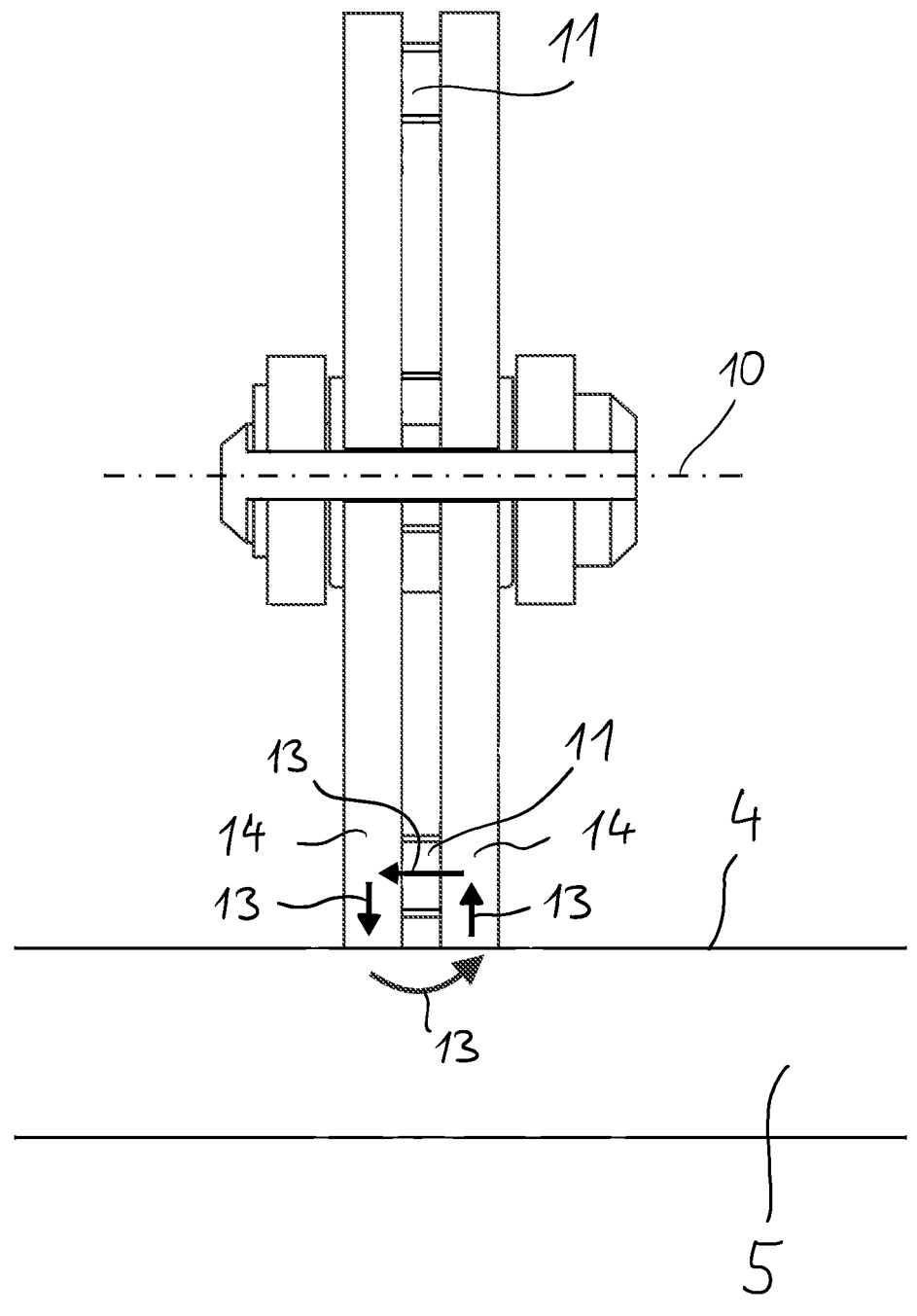
FIG. 5 shows a sectional view of a subject matter according to the invention.

The carrier 6 of the odometer 2 is designed to form a closed magnetic circuit with the surface 4 and, to this end, has conducting elements 14, which are arranged laterally adjacent to a respective magnet 11 in the direction of the axis of rotation 10 and form a magnetic circuit indicated by arrows 13 (FIG. 5). The magnetic field of a respective magnet 11 is conducted and, in particular, focused in the direction of the surface 4 by the conducting elements 14. This results in high attractive forces between the carrier 6 and the surface 4—provided this is at least also composed of a magnetizable material—which counteracts slipping of the carrier 6 during the rolling movement. This improves the distance measurement performed by the odometer, and the positioning of the inspection and cleaning device on the basis of the signals generated by the magnetic field sensor is improved.

Figure 9:
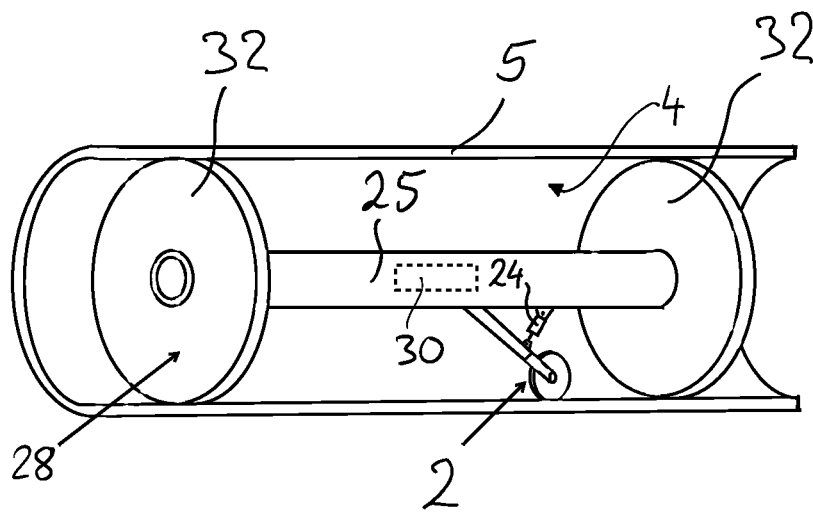
FIG. 9 shows a further subject matter according to the invention.

The holder 8 is typically fastened to an inspection and/or cleaning device 28, which is pushed through a pipeline by a medium via propulsion elements, for example in the form of cups or disks 32. In particular, the holder 8 here is resiliently supported with respect to a central body 25 of the inspection and/or cleaning device 29 (also referred to as a pig) by a pressing device 24 (c.f. FIG. 9).

In the present case, the exemplary embodiments are provided with a total of sixteen magnets 11, which are arranged circumferentially and relatively far towards the outer circumference of the respective carrier 6 between conducting elements 14 (FIG. 3). The carrier of the odometer is held by two supporting arms 15, which converge in a base of the holder 8. Located in this base is the magnetic field sensor 12, which is therefore positioned at the circumference of the carrier 6, which is circular as seen from a side view.

Figure 4:
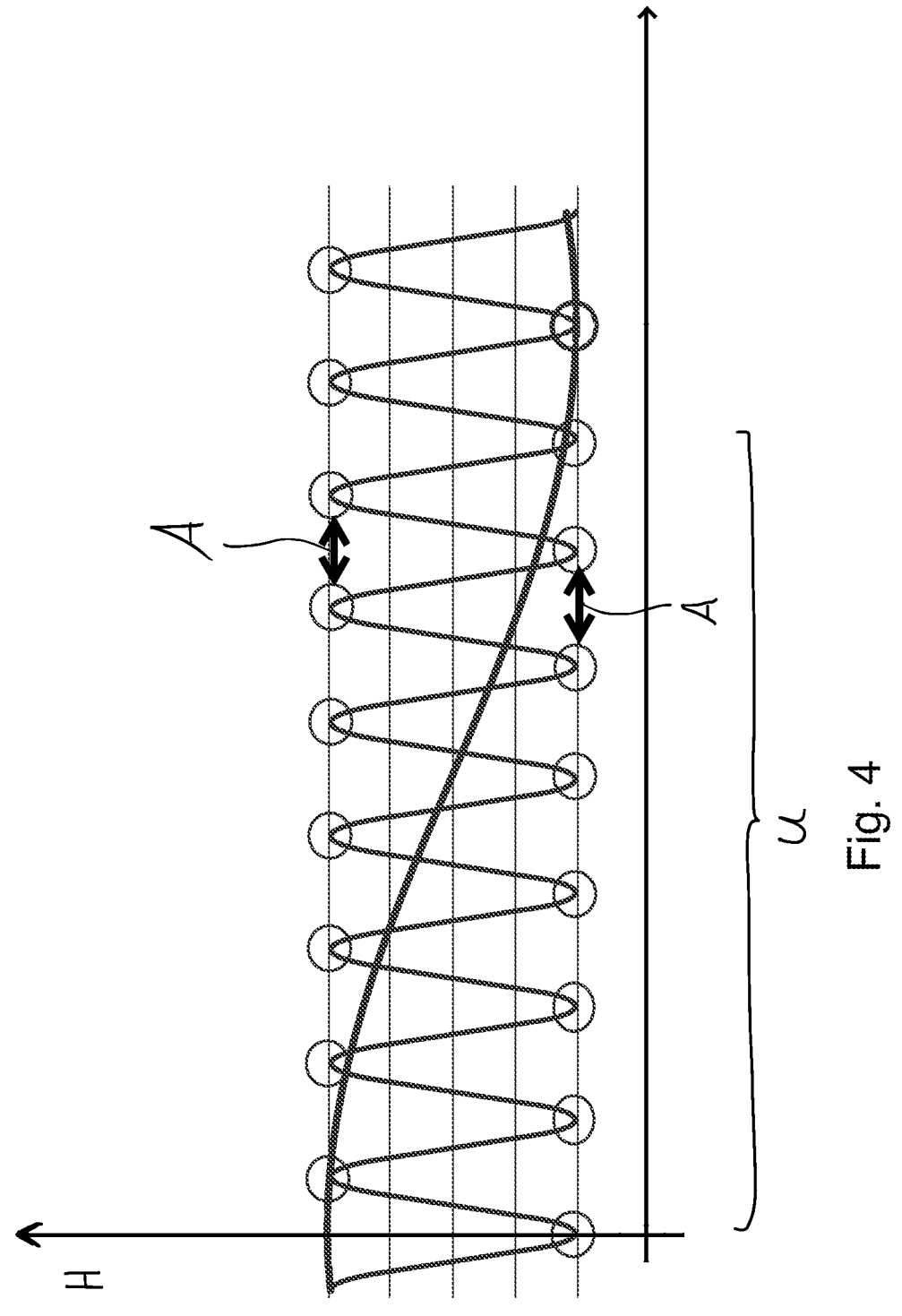
FIG. 4 shows measuring data of a subject matter according to the invention.

The movement of the magnets 11 along the magnetic field sensor 12, which takes place during operation, results in an idealized signal curve (depicted in FIG. 4), with a total of eight minima and eight maxima for each half revolution of the carrier 6, which are produced by the mutually successive magnets with the same alignment. A full revolution U of the circular carrier over 360° may therefore be broken down into seventeen maxima or minima denoted by small circles (FIG. 4). The further curve below the curve with the many minima and maxima, which has only one maximum and only one minimum, would be produced in the case of odometers which are typically used in the prior art and which only have one revolving magnet in the carrier. Compared to this, the accuracy of the measurement of the odometer 2 according to the invention is significantly improved.

Depending on the spacing A between successive maxima and minima, it is possible to infer a partial slipping of the carrier or odometer 2, which can likewise be easily identified owing to the multiplicity of measurements carried out for each revolution. The change in height H of the maxima and minima moreover gives information about the wear and/or deformation of the wheel-shaped carrier 6.

According to an exemplary embodiment of the invention, the magnetic attractive force between magnets 11 of the carrier 6 and the wall of a pipeline is greater than the force brought about by the contact pressure of the carrier 6. In particular, owing to the magnetic attractive force, the bearing friction produced by the holder pressing the carrier 6 against the surface of a wall may be reduced. This in turn evens out the rolling of the odometer 2 along the surface 4.

Figure 6:
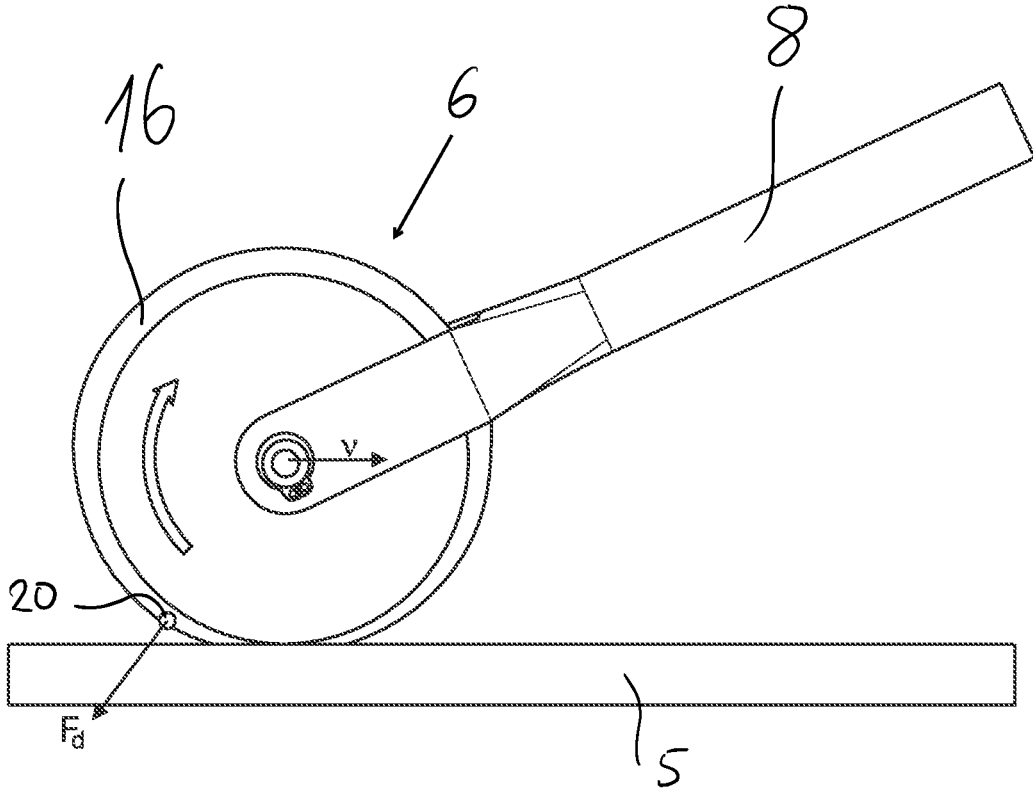
FIG. 6 shows a further subject matter according to the invention.

In addition, a sheathing 16 of the carrier 6 may be provided, which increases the friction between the wheel-shaped carrier 6 and the wall 5. The sheathing 16 is, in particular, designed to be flexible, so that, during operation, it is compressed at the point of the smallest spacing between the magnet 11 and the wall 5 and then expands again, as shown in FIG. 6. As a result, the spacing between magnetic dirt, i.e. magnetically attracted particles in the pipeline, which is present on the outside of the coating, and the magnets 11 is increased again so that a force Fd may act on the grime, which force is determined by centrifugal forces and/or by a magnetic attraction of the wall, which is generated as result of the magnetization by the odometer, and results in the dirt 20 no longer being able to adhere magnetically to the carrier 6.

Figure 7:
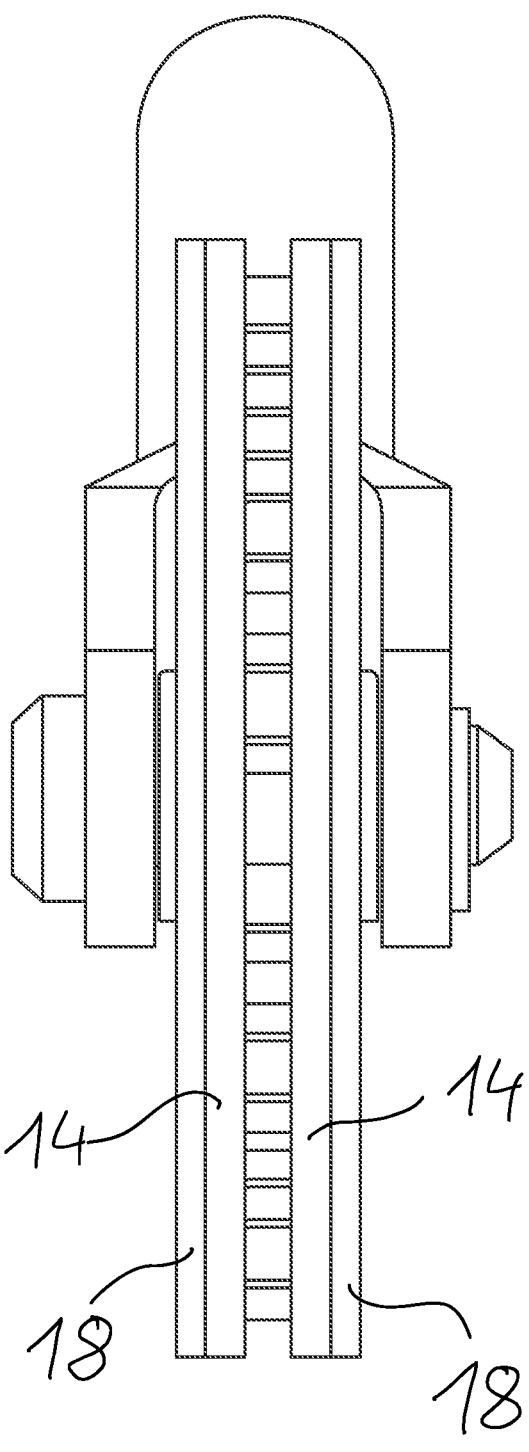
FIG. 7 shows a further subject matter according to the invention.
Figure 8:
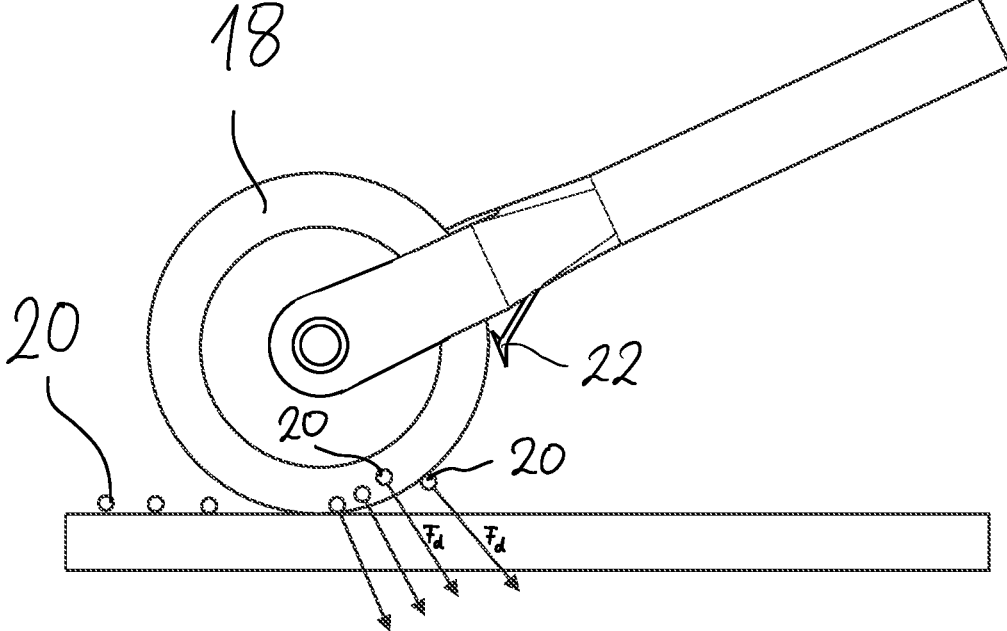
FIG. 8 shows the subject matter according to FIG. 7 in a side view.

In addition, a circumferentially extending, non-magnetic coating 18 may be arranged on both sides of the magnets and, in particular, the conducting elements 14, which coating likewise has the same effect as the sheathing 16 described above. As a result of the additional spacing, less grime is able to collect on the conducting elements 14, so that any grime 20 tends to be more likely to adhere to the pipeline wall (FIGS. 7 and 8). In addition, a cleaning element 22 may be arranged on the holder 8, which cleaning element mechanically scratches magnetically adhering dirt from the surface of the sheathing (FIG. 8).

In the present case, in addition to an odometer 2 described above, an inspection and/or cleaning device according to the invention furthermore comprises the pressing device 24 for positioning the carrier 6 on a surface of the wall 5 of a pipeline. This inspection and/or cleaning device likewise comprises the EDP device 30 for receiving the signals of the magnetic field sensor 12 arranged in a central body 25. At the end of the measuring operation, the data present in this EDP device 30 are transferred to an analysis device, which is designed to infer a deformation and/or a slipping of the wheel-shaped carrier 6 with the aid of the signal curve and, in particular, the changes in height H of the measured signals and the amplitude spacings A.

The invention claimed is:

1. An odometer for distance measurement in an inspection and/or cleaning device, the odometer comprising:
   - a carrier for rolling on a surface of a magnetizable wall, the carrier being arranged in a holder of the odometer so as to be rotatable about an axis of rotation formed during operation, the carrier having a plurality of magnets arranged circumferentially around the axis of rotation; and
   - a magnetic field sensor generating signals produced through rotation of the magnets, wherein the carrier generates a closed magnetic circuit with a respective magnet and the magnetizable wall,
   - wherein the magnetic field strength of at least one of the magnets at an outer circumference of the carrier in the air and away from the wall is a maximum of 500 kA/m.

2. The odometer as claimed in claim 1, wherein the carrier has at least one magnetizable conducting element, which conducts the magnetic field of a respective magnet.

3. The odometer as claimed in claim 2, wherein the magnets are arranged with North-South alignments at an angle of smaller than 15° to the axis of rotation.

4. The odometer as claimed in claim 3, having at least two conducting elements, wherein the conducting elements delimit a respective magnet on both sides in a direction parallel to the axis of rotation and extend radially outwards to form a respective magnetic circuit with the wall.

5. The odometer as claimed in claim 1, wherein the magnets generate an attractive force with the wall, which at least substantially determines a rolling friction.

6. The odometer as claimed in claim 1, wherein the magnetic field strength of at least one of the magnets at the outer circumference of the carrier during operation and in the wall is at least 5 kA/m.

7. The odometer as claimed in claim 1, wherein the magnetic field strength of at least one of the magnets at the outer circumference of the carrier in the air and away from the wall is a maximum of 200 kA/m.

8. The odometer as claimed in claim 1, wherein the magnets are movable relative to the magnetic field sensor arranged on or in a holder of the odometer.

9. The odometer as claimed in claim 1, wherein the magnetic field sensor is arranged eccentrically with respect to the axis of rotation.

10. The odometer as claimed in claim 1, wherein the carrier is provided with a flexible sheathing at the circumference.

11. The odometer as claimed in claim 1, wherein the wheel-shaped carrier has a circumferentially extending, non-magnetic coating, on at least one side.

12. The odometer as claimed in claim 1, further including a cleaning element which is provided for scratching off adhering magnetic dirt and acts at least on a region located at the circumference of an outer surface of the carrier.

13. An inspection and/or cleaning device, comprising:
   - an odometer as claimed in claim 1;
   - a pressing device acting on the holder to position the carrier on a surface, wherein a pressing force which acts in an axle bearing during operation is lower than an attractive force produced by a magnet which is close to the surface.

14. An odometer arrangement having an odometer as claimed in claim 1, and comprising, an EDP device for receiving the signals of the magnetic field sensor.

15. The odometer arrangement as claimed in claim 14, further including an analysis device to infer a deformation and/or a slipping of the carrier with the aid of a signal curve.

16. The odometer as claimed in claim 2, wherein the at least one magnetizable conducting element focuses the magnetic field of a respective magnet.

17. The odometer as claimed in claim 3, wherein the magnets are arranged with their North-South alignments parallel to the axis of rotation.

* * * * *